United States Patent
Bahena et al.

(10) Patent No.: US 11,440,668 B2
(45) Date of Patent: Sep. 13, 2022

(54) MULTI-PHASED EVACUATION SYSTEM

(71) Applicant: Goodrich Corporation, Charlotte, NC (US)

(72) Inventors: Daniel Bahena, Phoenix, AZ (US); Timothy C Haynes, Prescott Valley, AZ (US)

(73) Assignee: Goodrich Corporation, Charlotte, NC (US)

( * ) Notice: Subject to any disclaimer, the term of this patent is extended or adjusted under 35 U.S.C. 154(b) by 511 days.

(21) Appl. No.: 16/595,757

(22) Filed: Oct. 8, 2019

(65) Prior Publication Data
US 2021/0101688 A1   Apr. 8, 2021

(51) Int. Cl.
  *B64D 25/18*   (2006.01)
  *B64D 25/14*   (2006.01)
  *B63C 9/04*    (2006.01)

(52) U.S. Cl.
  CPC ............. *B64D 25/18* (2013.01); *B63C 9/04* (2013.01); *B64D 25/14* (2013.01); *B63C 2009/042* (2013.01)

(58) Field of Classification Search
  CPC .......... B64D 25/14; B64D 25/18; B63C 9/04; B63C 2009/042
  See application file for complete search history.

(56) References Cited

U.S. PATENT DOCUMENTS

| | | | |
|---|---|---|---|
| 3,464,515 A | 9/1969 | Evans | |
| 3,679,025 A * | 7/1972 | Rummel | B64D 25/14 |
| | | | 182/20 |
| 3,833,088 A * | 9/1974 | Chacko | B64D 25/14 |
| | | | 193/25 B |
| 3,860,984 A | 1/1975 | Fisher | |
| 2019/0061960 A1 * | 2/2019 | McEwen | B64D 25/14 |

* cited by examiner

*Primary Examiner* — Tye William Abell
(74) *Attorney, Agent, or Firm* — Snell & Wilmer L.L.P.

(57) ABSTRACT

An evacuation system may comprise a first plurality of tubes configured to inflate by an aspirator and pressure cylinder upon deployment from an aircraft. The evacuation system may further comprise a second plurality of tubes coupled to the first plurality of tubes. The second plurality of tubes may be configured to be in deflated state when the evacuation system is in a slide configuration. The second plurality of tubes may be configured to be in an inflated state when the evacuation system is in a raft configuration.

18 Claims, 8 Drawing Sheets

SECT A-A

SECT A-A

MULTI-PHASED EVACUATION SYSTEM

FIELD

The present disclosure relates to aircraft evacuation systems and, in particular, to an evacuation slide/raft having multiple phases.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft.

SUMMARY

A dual inflation assembly is disclosed herein. The dual inflation assembly may comprise: a first plurality of tubes in fluid communication with each other, the first plurality of tubes configured to inflate from a first deflated state to a first inflated state and form a slide configuration of an evacuation system of an aircraft; and a second plurality of tubes coupled to the first plurality of tubes, the second plurality of tubes in fluid communication with each other, the second plurality of tubes configured to be in a second deflated state in the slide configuration.

In various embodiments, the second plurality of tubes are configured to inflate and form a raft configuration including a support structure comprising the first plurality of tubes and a railing structure comprising the second plurality of tubes. The dual inflation assembly may further comprise a reactant packet disposed within the second plurality of tubes, the reactant packet including a chemically reactive material configured to react to produce a gas and inflate the second plurality of tubes. The dual inflation assembly may further comprise an aspirator coupled to the first plurality of tubes. The dual inflation assembly may further comprise an ignitor coupled to the reactant packet, the ignitor configured to activate the reactant packet and inflate the second plurality of tubes to form a raft configuration. The dual inflation assembly may further comprise a triggering system configured to convert the dual inflation assembly from the slide configuration to the raft configuration. The dual inflation assembly may further comprise a bag disposed in the second plurality of tubes, wherein the reactant packet is disposed within the bag. The dual inflation assembly may further comprise a plurality of reactant packets that includes the reactant packet.

An aircraft including an evacuation system is disclosed herein. The evacuation system may comprise: a first plurality of tubes; an aspirator coupled to the first plurality of tubes, the aspirator in fluid communication with a pressure cylinder and configured to inflate the first plurality of tubes from a first deflated state to a first inflated state upon deployment of the evacuation system into a slide configuration; a second plurality of tubes coupled to the first plurality of tubes; and a reactant packet disposed within the second plurality of tubes, the reactant packet including a chemically reactive material configured to react to produce a gas and inflate the second plurality of tubes from a second deflated state to a second inflated state.

In various embodiments, the evacuation system further comprises a sliding surface disposed between the first plurality of tubes and the second plurality of tubes. The second plurality of tubes may be in the second deflated state when the evacuation system is in the slide configuration. The evacuation system may further comprise a plurality of reactant packets including the reactant packet. The evacuation system may further comprise a bag disposed within the second plurality of tubes, wherein the reactant packet is disposed within the bag. The evacuation system may further comprise an ignitor coupled to the reactant packet, the ignitor configured to activate the reactant packet upon detachment of the evacuation system from the aircraft. The evacuation system may further comprise a trigger system and a cable assembly, wherein the cable assembly is coupled to the trigger system and the reactant packet. The trigger system may be coupled to the second plurality of tubes.

A method of converting a dual inflation assembly of an evacuation system from a slide configuration to a raft configuration is disclosed herein. The method may comprise: receiving, by a processor, a parameter measurement from a sensor; detecting, by the processor, that a first plurality of tubes of the dual inflation assembly is acting as a flotation device in response to receiving the parameter measurement; commanding, by the processor, a trigger system to apply a current to a reactant packet disposed in a second plurality of tubes of the dual inflation assembly, the second plurality of tubes coupled to the first plurality of tubes in a first inflated state, wherein the second plurality of tubes inflate from a second deflated state to a second inflated state in response to the current igniting an electrical ignitor of the reactant packet and activating the reactant packet to produce a gas.

In various embodiments, the reactant packet is disposed within a bag, the bag configured to contain a reacting of a chemically reactive material from the reactant packet. The second inflated state of the second plurality of tubes may form the raft configuration including a support structure comprising the first plurality of tubes and a railing structure comprising the second plurality of tubes. The first plurality of tubes may be in the first inflated state prior to activating the reactant packet.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

Figure 1A:
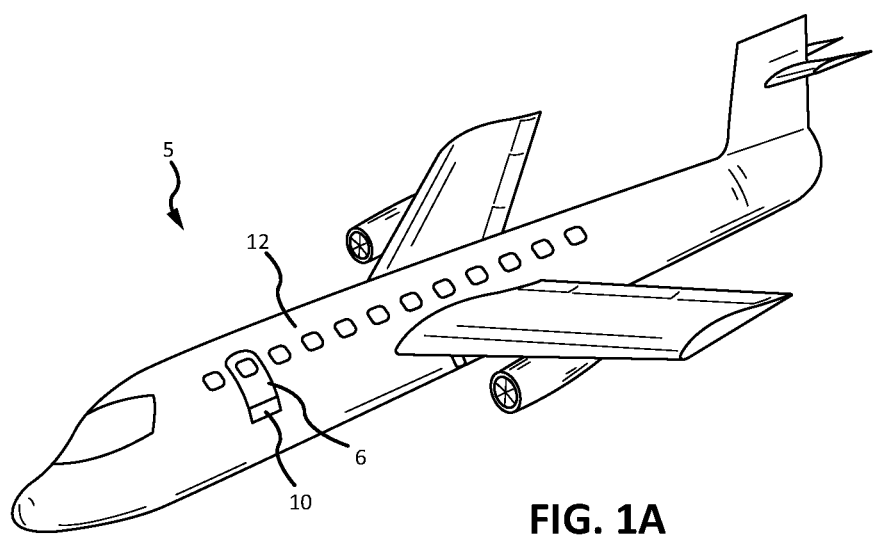
FIG. 1A illustrates a perspective view of an aircraft comprising an evacuation system, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Evacuation systems of the present disclosure may include inflatable apparatus having a multi-phased slide raft. The inflatable apparatus may comprise a slide configuration and a raft configuration. A "slide configuration," as described herein, is a configuration for use during an evacuation event from an aircraft (e.g., to slide from the fuselage of an aircraft to the ground or to water). A "raft configuration," as described herein, is a configuration including a support structure and railings for use as a flotation device. An "inflated state" as described herein, is filled with air or fluid (i.e., an expanded state of a tube where pressure is exerted on an internal surface of a tube). A "deflated state," as described herein is a compact state where there is little to no pressure exerted on an internal surface of a tube.

The slide configuration may inflate a first plurality of tubes only. The raft configuration may inflate a second plurality of tubes upon dislodging the slide from an aircraft. The first plurality of tubes may be inflated via a pressure cylinder through an aspirator. The second plurality of tubes may be inflated by a chemical reaction. The chemical reaction may be triggered manually or automatically. Chemicals that create the chemical reaction may be disposed in the second plurality of tubes. In various embodiments, the chemicals are disposed in a plurality of bags. In various embodiments, the plurality of packets are coupled in series within the second plurality of tubes. By having the second plurality of tubes only inflate in a raft configuration, a smaller inflation system for the slide configuration may be utilized. This may decrease cost and weight of an evacuation system of an aircraft.

FIG. 1A illustrates a perspective view of an aircraft 5 having an evacuation system compartment 10, in accordance with various embodiments. Aircraft 5 may comprise a fuselage 12 with wings fixed to fuselage 12. An emergency exit door 6 may be disposed on fuselage 12 to allow passengers to exit the aircraft 5. Emergency exit door 6, in various embodiments, may be situated over the wings of the aircraft such that passengers exiting through the emergency exit door 6 can exit onto the wing(s). Emergency exit door 6 may be situated at any suitable location along fuselage 12. In various embodiments, evacuation system compartment 10 may be coupled to emergency exit door 6 and/or fuselage 12 and may be on the inside or outside of aircraft 5. Evacuation system compartment 10 may comprise an evacuation system, which may be deployed in response to opening emergency exit door 6, for example.

Figure 1B:
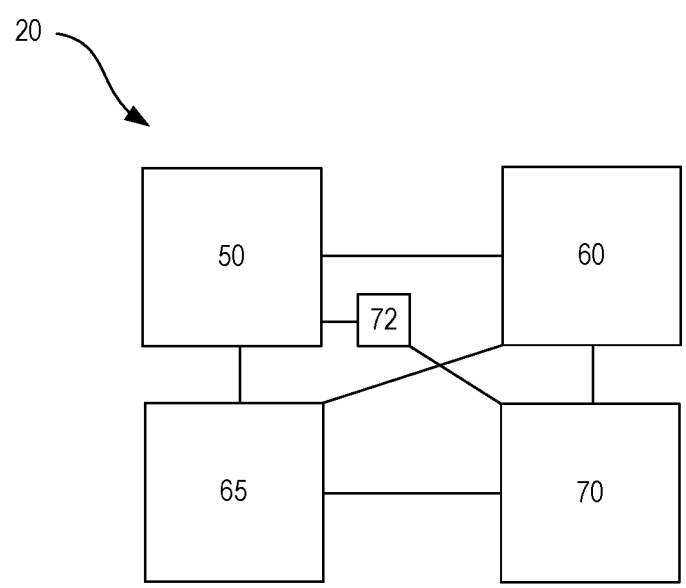
FIG. 1B illustrates a block diagram of an evacuation system, in accordance with various embodiments.

In various embodiments, with reference to FIGS. 1A and 1B, evacuation system compartment 10 may comprise an evacuation system 20. Evacuation system 20 may comprise an evacuation slide 50, a reactant packet 60 (which may comprise various reactant packet stages, i.e., primary, secondary, etc.), a trigger system 65, and/or a processor 70. Reactant packet 60 may be coupled to evacuation slide 50. Trigger system 65 may be electrically coupled to processor 70 and/or reactant packet 60 in any suitable manner such as an electronic cable or a wireless connection. In various embodiments, processor 70 may be comprised in trigger system 65. In various embodiments, evacuation system 20 may comprise a sensor 72. Sensor 72 may be coupled to evacuation slide 50 to measure a parameter of evacuation slide 50 and/or the surrounding environment. Processor 70 may be in electronic communication with sensor 72 and/or evacuation slide 50. Examples of the components of evacuation system 20 will be further explained herein.

Figure 2A:
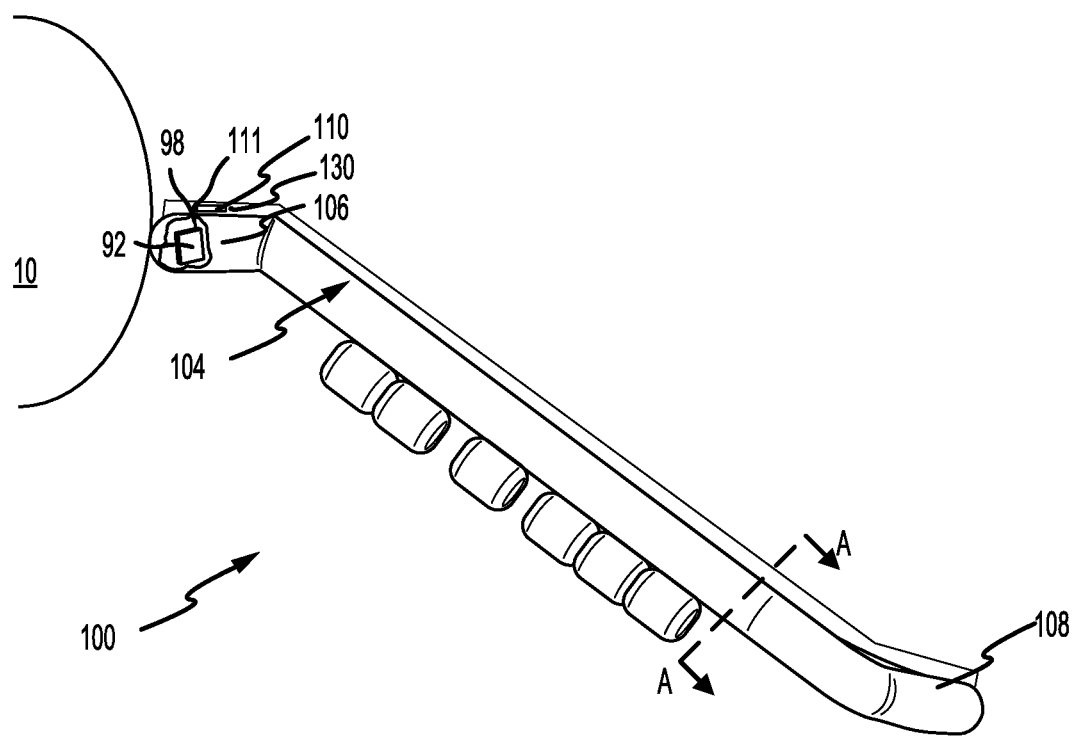
FIG. 2A illustrates a side view of an evacuation system in a slide configuration, in accordance with various embodiments.

With reference to FIG. 2A, a side view of an evacuation system 100 (an example of evacuation system 20 in FIG. 1B) in a slide configuration is illustrated, in accordance with various embodiments. Evacuation system 100 may comprise a dual inflation assembly 104. Dual inflation assembly 104 may be deployed from an aircraft 10. Dual inflation assembly 104 may comprise an inflatable slide. Dual inflation assembly 104 may comprise a head end 106 and a toe end 108 opposite head end 106. Head end 106 may be coupled to an aircraft 10. Upon deployment, toe end 108 may contact an exit surface (e.g., the ground or the water) in response to dual inflation assembly 104 being deployed. In the event of a water landing, dual inflation assembly 104 may be uncoupled from the aircraft structure and serve as a life raft in a life raft configuration.

Figure 3:
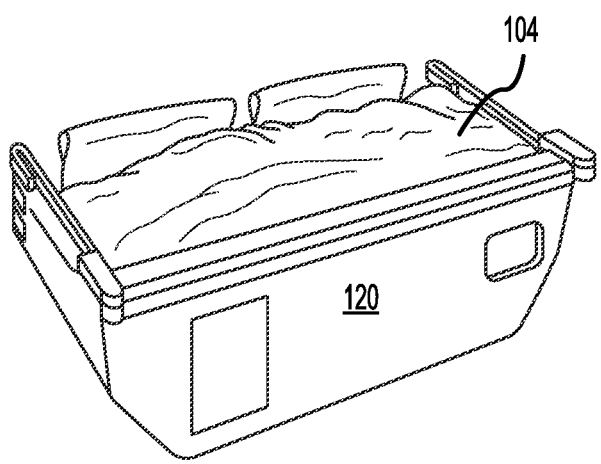
FIG. 3 illustrates a perspective view of an evacuation system in a packed configuration, in accordance with various embodiments.

Referring to FIG. 3, dual inflation assembly 104 is illustrated in a stowed and/or packed position. In this regard, dual inflation assembly 104 may be stowed in a packboard 120. In various embodiments, dual inflation assembly 104 may be folded in the stowed position. In various embodiments, dual inflation assembly 104 may be deployed from packboard 120 in response to opening an emergency exit door. Packboard 120 may be coupled to an aircraft in an installed position. Typically, a packboard 120 includes a blow-out panel which opens in response to deployment of dual inflation assembly 104 and through which the inflatable slide may exit the packboard 120. In this regard, dual inflation assembly 104 may be configured to be deployed from an aircraft.

Figure 2B:
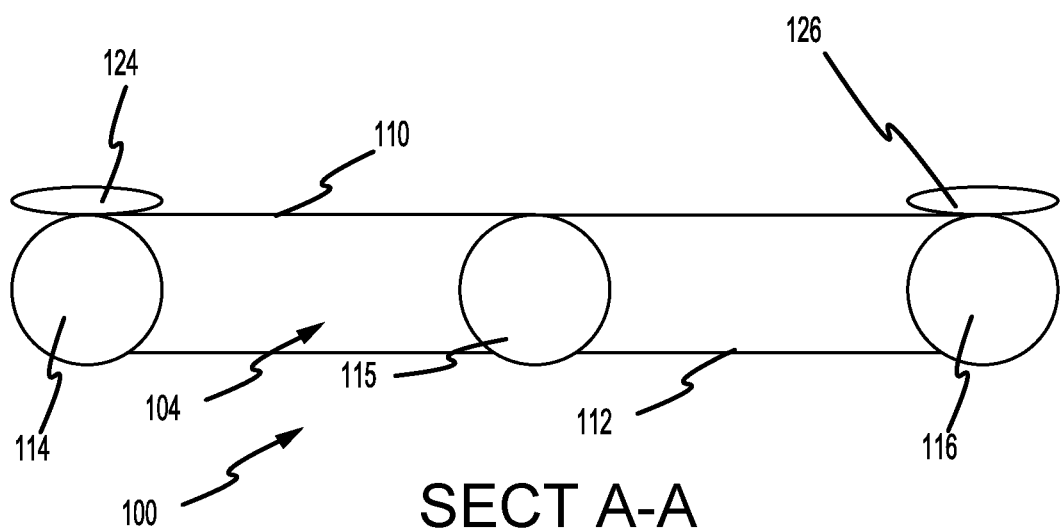
FIG. 2B illustrates a cross-sectional view of an evacuation system in a raft configuration, in accordance with various embodiments.

Referring now to FIG. 2B, an evacuation system 100 in a slide configuration along cross sectional line A-A from FIG. 2A is illustrated, in accordance with various embodiments. With reference to FIGS. 2A and 2B, dual inflation assembly 104 may comprise a sliding surface 101 and an underside surface 112 opposite sliding surface 101. Sliding surface 101 may extend from head end 106 to toe end 108. Dual inflation assembly 104 may comprise a first left side tube 114, a first right side tube 116, and a center tube 115 parallel and disposed between first left side tube 114 and first right side tube 116. First left side tube 114 and first right side tube 116 may be disposed on opposing sides of dual inflation assembly 104 and may extend from head end 106 to toe end 108. First left side tube 114, first right side tube 116, and center tube 115 may be integrally formed and in fluid communication. Stated differently, first left side tube 114 and first right side tube 116 may be part of a one interconnected chamber that fills with gas upon deployment of dual inflation assembly 104.

Evacuation system 100 may further comprise a second left side tube 124 coupled to first left side tube 114 and a second right side tube 126 coupled to first right side tube 116. In various embodiments, sliding surface 101 is disposed between first left side tube 114 and second left side tube 124 and between first right side tube 116 and second right side tube 126. In various embodiments, sliding surface 101 extends from first left side tube 114 to first right side tube 116. In various embodiments, sliding surface 101 is made of fabric, or any other material known in the art. In the slide configuration, second left side tube 124 and second right side tube 126 are in a deflated state.

With continued reference to FIGS. 2A and 2B, in various embodiments, evacuation system 100 may comprise a dual inflation assembly 104 and a reactant packet (an example of reactant packet 60 in FIG. 1B), for example reactant packet 110 disposed within second right side tube 126 and/or second left side tube 124. Evacuation system 100 may further comprise a trigger system 92 (an example of trigger system 65 in FIG. 1B) coupled to reactant packet 110. Trigger system 92 may be coupled to emergency exit door 6, fuselage 12, the dual inflation assembly 104, and/or any other suitable part of an aircraft or evacuation system 100. In various embodiments, trigger system 92 may be coupled to dual inflation assembly 104. In various embodiments, reactant packet 110 may be electronically coupled to trigger system 92 via a wireless connection. In various embodiments, reactant packet 110 may be electronically coupled to trigger system 92 via a cable assembly 98. A cable end of cable assembly 98 may be coupled to reactant packet 110.

The trigger system 92 may activate the reactant packet 110 upon detaching the dual inflation assembly 104 from the aircraft 10 and switch from a slide configuration to a raft configuration. In various embodiments, the reactant packet may activate on a time delay from dethatching the dual inflation assembly 104 from the aircraft 10 (e.g., a 20 second time delay or a 10 second time delay).

In various embodiments, reactant packet 110 may comprise a chemically reactive material (e.g., in an enclosing package) configured to react in response to being activated (e.g., ignited) and produce gas as a product of the reaction to a second plurality of tubes (e.g., second left side tube 124 and second right side tube 126). The reaction of the chemically reactive material may be an energetic gas-generating reaction. The chemically reactive material may be a solid material and/or initially gasless (i.e., there is no pressurized gas that will be used as the primary gas source to inflate the second plurality of tubes [e.g., second left side tube 124 and second right side tube 126]). Additionally, in various embodiments, inflation of the second plurality of tubes may not require entrainment of ambient air. The chemically reactive material may be any suitable material, such as a material that includes sodium azide. For example, reactant packet 110 may comprise sodium azide, potassium nitrate, and silicon dioxide. In response to being ignited, the sodium azide may form nitrogen gas, which inflates the second plurality of tubes to form the raft configuration, and elemental sodium. The elemental sodium may react in a secondary reaction with the potassium nitrate to form potassium oxide, sodium oxide, and additional nitrogen gas. Finally, a tertiary reaction may take place in which potassium oxide, sodium oxide and silicon dioxide react to form silicate glass (potassium silicate and sodium silicate). This reaction is simply an exemplary reaction of a chemically reactive material to create (nitrogen) gas to inflate the second plurality of tubes and form the raft configuration, as the chemically reactive material may be any suitable material.

Figure 4A:
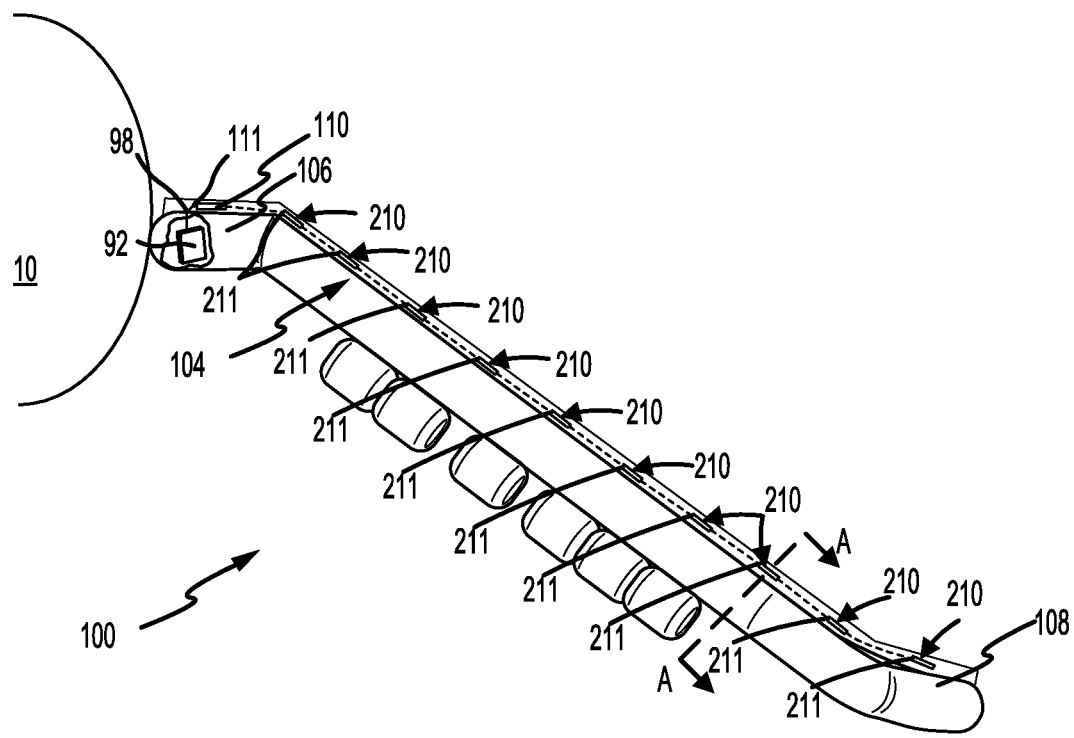
FIG. 4A illustrates a side view of an evacuation system in a slide configuration, in accordance with various embodiments.
Figure 4B:
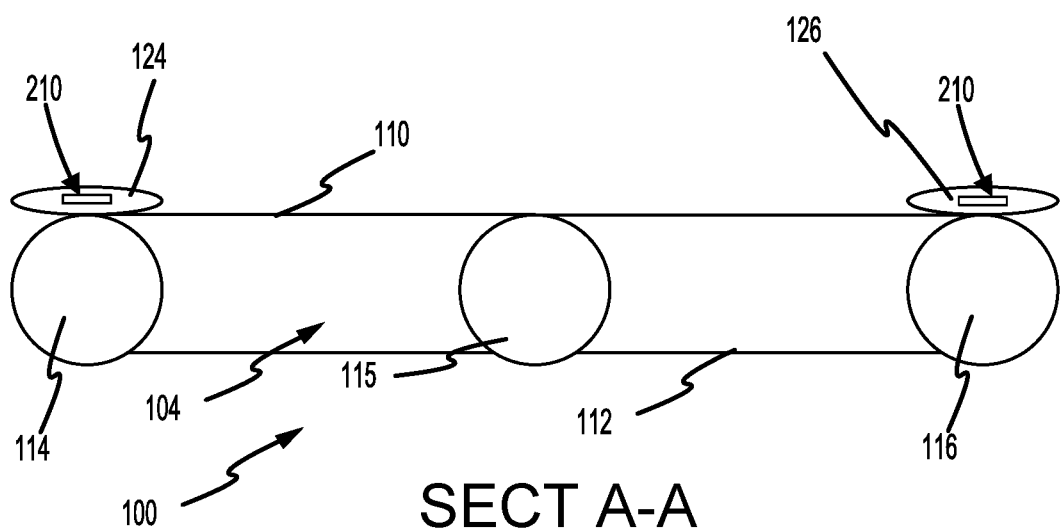
FIG. 4B illustrates a cross-sectional view of an evacuation system in a raft configuration, in accordance with various embodiments.

In various embodiments, with reference now to FIG. 4A, evacuation system 100 may have multiple stages of reactant packets, wherein each reactant packet comprises a chemically reactive materials, as described herein. Reactant packet 110 may be a first stage of a reactant packet in evacuation system 100 and may be coupled in series or parallel to a plurality of reactant packets 210. Referring to FIGS. 2A and 4A, reactant packet 110 may be activated first. In various embodiments, the evacuation system 100 may comprise a single reactant packet and the second plurality of tubes may contain the chemically reactive material. In various embodiments, reactant packet 110 may be activated first, followed by secondary stage reactant packet adjacent to reactant packet 110 in the plurality of reactant packets 210, and subsequently, a third stage reactant packet adjacent to the second stage reactant packet in the plurality of reactant packets 210, and so on. For example, a ten stage reactant packet system may comprise ten reactant packets activated in series. In various embodiments, the reactant packet stages may be activated in any suitable order. The activation of the reactant packets and/or reactant packet stages may be staggered in any suitable manner such as based on time intervals, pressure within the second plurality of tubes (e.g., second left side tube 124 and second right side tube 126), and/or temperature in or proximate to the second plurality of tubes. The reactant packets in a reactant packet stage may be activated simultaneously or sequentially or combinations thereof.

With reference to FIGS. 2B and 4A, reactant packet 110 and or each reactant packet in the plurality of reactant packets 210 may comprise ignitors 111, 211, respectively. Ignitors 111, 211 may be devices that are configured to ignite in response to being actuated in order to activate the reaction of the chemically reactive material in reactant packet 110 and/or the plurality of reactant packets 210. Cable assembly 98 may be coupled to ignitors 111, 211 (e.g., first stage cable end may be coupled to ignitors 111 and second stage cable end may be coupled to adjacent ignitor, etc). In response to actuation from trigger system 92 via cable assembly 98, ignitors 111, 211 may be ignited, causing the reaction of the chemically reactive material in reactant packet 110 and/or the plurality of reactant packets 210 to occur, generating the gas to inflate evacuation the second plurality of tubes (e.g., second left side tube 124 and second right side tube 126). In various embodiments, every reactant packet in evacuation system 100 may comprise an ignitor.

In various embodiments, ignitors 111, 211 may be electrical ignitors. In such embodiments, trigger system 92 may apply a current via cable assembly 98 to ignitors 111, 211, which in response, actuates ignitors 111, 211, and initiates the reaction of the chemically reactive material in reactant packet 110 and/or the plurality of reactant packets 210. In various embodiments, ignitors 111, 211 may be mechanical ignitors. In such embodiments, trigger system 92 may cause cable assembly 98 to apply a mechanical force upon ignitors 111, 211 (e.g., by application of a firing pin), which may comprise a primer, to actuate ignitors 111, 211.

In various embodiments, evacuation system 100 may further comprise a sensor 130 (an example of sensor 72 in FIG. 1B). Sensor 130 may be coupled to dual inflation assembly 104 in any suitable location, such as within or on the second plurality of tubes 160. Additionally, there may be any number of sensors 130 disposed in or along dual inflation assembly 104, such as one sensor 130 proximate every reactant packet. Sensor 130 may be any suitable sensor to measure a parameter of the environment in which evacuation system 100 is operating and/or parameters during operation of evacuation system 100. For example, sensor 130 may be a level switch or accelerometer, which may detect, for instance, that dual inflation assembly has been released from door 6 and/or fuselage 12 (in FIG. 1) and dropped into a raft configuration.

As another example, sensor 130 may be a temperature or pressure sensor. Sensor 130 may take measurements of pressure and/or temperature in order to determine whether auxiliary reactant packets coupled to dual inflation assembly 104 should be activated to generate more gas (e.g., in a cold environment in which gas will not expand as much as a warmer environment, and thus less pressure would result than in a warmer environment). In various embodiments, the number of reactant packets in the plurality of reactant packets 210 that are activated may be determined by sensor 130 readings.

As yet another example, sensor 130 may be a position sensor configured to determine the orientation of the aircraft, evacuation system 100, and/or dual inflation assembly 104 after inflation of the first plurality of tubes 150. For example, parameter measurements from sensor 130 may indicate that the aircraft is positioned relative to the landing surface (e.g., land or water), such that none of the reactant packets in the plurality of reactant packets 210 should be activated and the evacuation system should form a slide configuration.

In various embodiments, sensor 130 may be configured to determine when the dual inflation assembly 104 is acting as a flotation device. For example, parameter measurements from sensor 130 may indicate the dual inflation assembly 104 is detached from an aircraft, such that each reactant packet in the plurality of reactant packets 210 should be activated. As such, each reactant packet in the plurality of reactant packets may be activated automatically upon detaching the dual inflation assembly 104 from the aircraft, on a time delay from detaching from the aircraft, or upon contacting the water and entering a raft configuration.

In addition, sensor 130 may allow determination of the rate of activation between the stages of reactant packets. For example, if the pressure caused by initial reactant packet in the plurality of reactant packets 210 (e.g., first stage reactant packets) is high because of a high surrounding or internal temperature, readings by sensor 130 of pressure and/or temperature (internal and/or external to dual inflation assembly 104) may allow a determination that activation of secondary stage reactant packets in the plurality of reactant packets 210 should be delayed more than normal during the activation sequence of the reactant packet stages (or prevented from activating at all together). In various embodiments, readings by sensor 130 may allow a determination that one or more reactant packets should not be activated if, for example, such reactant packets are not needed to achieve inflation of the second plurality of tubes 160.

In various embodiments, evacuation system 100 may comprise a processor (an example of processor 70 in FIG. 1B) in electronic communication with trigger system 92, sensor 130, and/or the reactant packets (e.g., reactant packet 110 and/or the plurality of reactant packets 210). In various embodiments, the processor may be comprised in trigger system 92, or any other suitable location in or outside the aircraft. The processor may be configured to operate as a data acquisition and digital signal processing system. For example, the processor may receive, and process, data acquired by sensor 130 and/or transmit commands to trigger system 92. In various embodiments, the processor may be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 5:
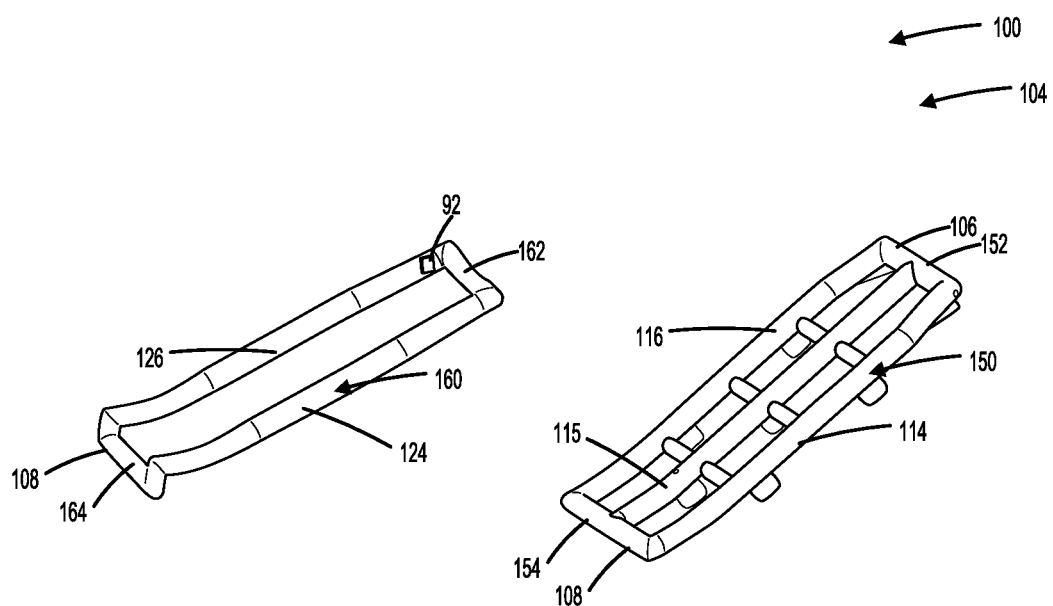
FIG. 5 illustrates a perspective exploded view of an evacuation system, in accordance with various embodiments.

Referring now to FIG. 5, an exploded view of an evacuation system 100 in a raft configuration is illustrated, in accordance with various embodiments. The evacuation system 100 comprises a first plurality of tubes 150 and a second plurality of tubes 160. The first plurality of tubes 150 comprises first left side tube 114, first right side tube 116, and first center tube 115. The first plurality of tubes 150 further comprise a first head tube 152 disposed at head end 106 of dual inflation assembly 104 and extending between first left side tube 114 and first right side tube 116. The first plurality of tubes 150 comprises first left side tube 114, first right side tube 116, and first center tube 115. The first plurality of tubes 150 further comprise a first toe tube 154 disposed at toe end 108 of dual inflation assembly 104 and extending between first left side tube 114 and first right side tube 116. The first plurality of tubes further comprises support tubes 156 extending between center tube 115 and first left side tube 114 and/or between center tube 115 and first right side tube 116. In various embodiments, the dual inflation assembly 104 comprises a support structure, the support structure including the first plurality of tubes 150 in a slide configuration and/or in a raft configuration of the evacuation system 100. For example, the first plurality of tubes 150 may provide a support structure for evacuees in a raft configuration and/or a slide configuration of the evacuation system 100. In various embodiments, the first plurality of tubes 150 are integral (e.g., the first plurality of tubes 150 may be fluidly coupled).

In various embodiments, the evacuation system 100 further comprises an aspirator 155 coupled to the first plurality of tubes 150. Upon deployment from the aircraft, a pressure cylinder may provide compressed air to the first plurality of tubes 150 through the aspirator 155 and creating a vacuum that pulls ambient air into the first plurality of tubes 150 and inflates the first plurality of tubes 150.

In various embodiments, the second plurality of tubes 160 are coupled to the first plurality of tubes 150. The second plurality of tubes 160 comprise second left side tube 124 and second right side tube 126. The second plurality of tubes 160 may further comprise a second head tube 162 disposed at head end 106 of dual inflation assembly 104 and extending between second left side tube 124 and second right side tube 126. The second plurality of tubes 160 may further comprise a second toe tube 164 disposed at toe end 108 of dual inflation assembly 104. In various embodiments, the second plurality of tubes 160 are integral (e.g., the second plurality of tubes are fluidly coupled). In various embodiments, the evacuation system 100 comprises a sliding surface 101 disposed between the second plurality of tubes 160. In various embodiments, the second plurality of tubes 160 are a perimeter of the sliding surface 101. In various embodiments, the evacuation system 100 comprises a trigger system 92 coupled to a tube in the second plurality of tubes 160, such as second right side tube 126, or any other tube in the second plurality of tubes 160. In various embodiments, the dual inflation assembly 104 includes a railing structure, the railing structure comprising the second plurality of tubes in the raft configuration.

Figure 6:
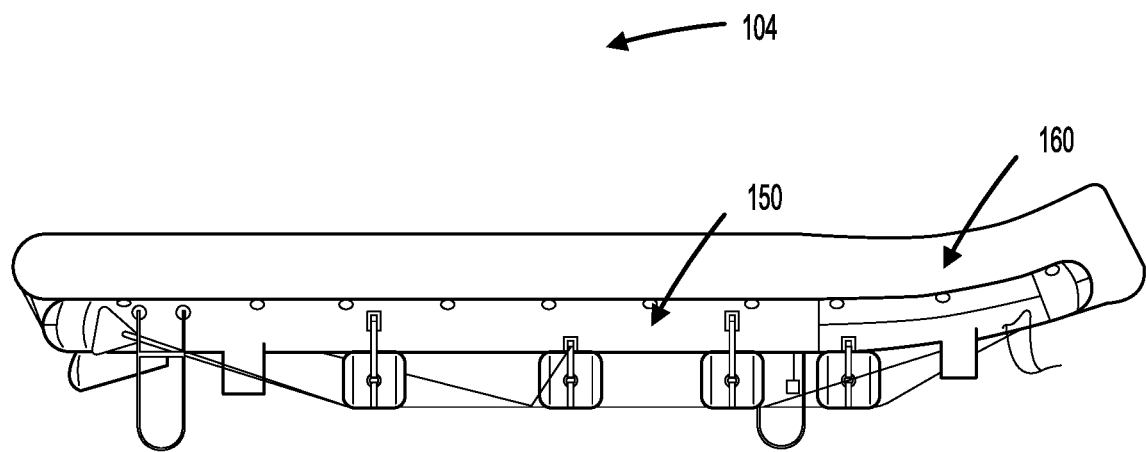
FIG. 6 illustrates a side view of an evacuation system in a raft configuration, in accordance with various embodiments.

Referring now to FIG. 6, a dual inflation assembly 104 in a raft configuration, in accordance with various embodiments, is illustrated. In various embodiments, the first plurality of tubes 150 and the second plurality of tubes 160 are both in an inflated state in raft configuration. In various embodiments, the second plurality of tubes 160 may act as barriers and/or rails to keep occupants within the dual inflation assembly 104.

Figure 7:
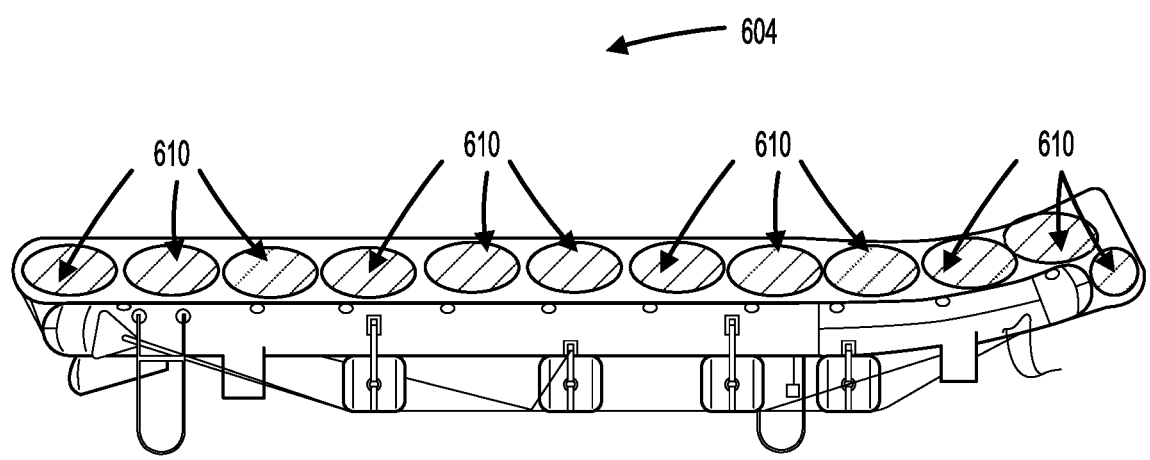
FIG. 7 illustrates a side view of an evacuation system in a raft configuration, in accordance with various embodiments.

Referring now to FIG. 7, a dual inflation assembly 604 in a raft configuration, in accordance with various embodiments, is illustrated. In various embodiments, each reactant packet from FIG. 4A may be disposed in a respective bag of a plurality of bags 610. By placing each packet from the plurality of reactant packets 210 from FIG. 4A in a respective bag from the plurality of bags 610, the chemical reaction after ignition of each reactant packet can be contained within the respective bag. Each bag in the plurality of bags 610 may be manufactured from fabric, such as woven nylon, silicone, urethane, polyester, aramid, or the like.

Figure 8:
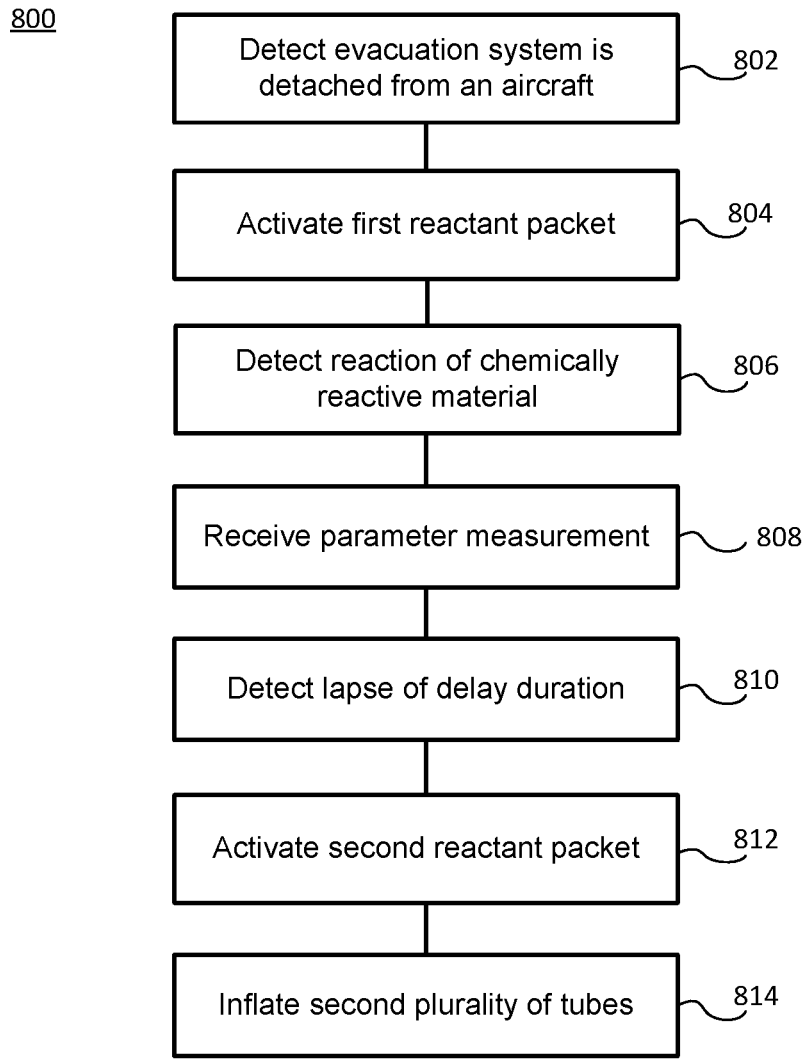
FIG. 8 illustrates a method of converting an evacuation system from a slide configuration to a raft configuration, in accordance with various embodiments.

FIG. 8 depicts a method 800 for converting a dual inflation assembly 104, 604 from a slide configuration to a raft configuration, in accordance with various embodiments. With combined reference to FIGS. 2A-2B, 4A-6 and FIG. 7, the process of converting dual inflation assembly 104, 604 from a slide configuration (FIGS. 2A-2B, 4A-5) to a raft configuration (FIGS. 6-7) is explained. In various embodiments, in response to emergency exit door 6 being opened, evacuation system 100 may be deployed into a slide configuration (i.e., the first plurality of tubes 150 of evacuation system 100 may be inflated via a pressure cylinder and aspirator 155), which may comprise dual inflation assembly 104, 604 being dropped outside of fuselage 12.

The processor comprised in evacuation system 100 may detect that evacuation system 100 has been detached from the fuselage 12 of aircraft 10 (step 802), and/or that dual inflation assembly 104, 604 is acting as a flotation device, via a sensor 130 comprising a level switch and/or accelerometer, for example. In response, the processor may command activation of a first reactant packet 110 (step 804), which may be a reactant packet from first stage reactant packets, or any other reactant packet stage. In various embodiments, evacuation system 100 may comprise any suitable number to reactant pack stages. Activation of the first reactant packet may comprise the processor commanding trigger system 92 to apply a current to a reactant packet in evacuation system 100. Trigger system 92 may be electronically coupled to a reactant packet, such as reactant packet 110. In response to receiving the command from the processor, trigger system 92 may apply a current to the first reactant packet (e.g., via cable assembly 98 or via a wireless connection and a battery comprised in the first reactant packet.

The current applied to the first reactant may actuate (i.e., ignite) an ignitor comprised in the first reactant packet, such as ignitors 111, 211 of reactant packet 110 and/or the plurality of reactant packets 210, respectively. In various embodiments, the ignitor may be mechanically activated. In response to actuation of the ignitor, the chemically reactive material in the first reactant packet may react. In various embodiments, the current applied to the first reactant packet by trigger system 92 may directly activate the chemically reactive material in the first reactant packet. The reaction of the chemically reactive material in the first reactant packet may create gas, inflating at least a portion of the second plurality of tubes 160 of dual inflation assembly 104, 604.

In response to the gas being produced, the second plurality of tubes 160 may begin to inflate by pressure created by the gas from the first reactant packet 110 (e.g., first stage reactant packet), as depicted in FIG. 4A. In response to the first reactant packet producing gas, the processor may detect the reaction of the chemically reactive material of the first reactant packet (step 806). The processor may detect the reaction by detecting a change in temperature and/or pressure from parameter measurements taken by sensor 130. Therefore, the processor may receive a parameter measurement (step 808) from sensor 130, detecting temperature, pressure, or any other parameter within and/or around dual inflation assembly 104, 604.

In various embodiments, the processor may command the activation of a second reactant packet (step 812), which may be, for example, an adjacent reactant packet in the plurality of reactant packets 210 from second stage reactant packet or any other reactant packet stage, or an auxiliary reactant packet. Activation of the second reactant packet may comprise the processor commanding trigger system 92 to apply current to the second reactant packet. The activation of the second reactant packet may be in response to receiving the parameter measurements from sensor 130. In various embodiments, the processor may command trigger system 92 to apply current to the second reactant packet in response to the measured parameter being detected by sensor 130 reaching or exceeding a parameter threshold. For example, once a certain temperature and/or pressure within or around the second plurality of tubes 160 of dual inflation assembly 104, 604 is reached (i.e., a temperature threshold or pressure threshold, respectively, or generically, a parameter threshold), the processor may detect such a parameter threshold from information received from sensor 130, and in response, command trigger system 92 to activate the second reactant packet. In various embodiments, the processor may command trigger system 92 to apply current to the second reactant packet in response to the measured parameter being detected by sensor 130 being below a parameter threshold. For example, if the pressure threshold is not reached after activation of the first reactant packet, the processor may command the activation of the second reactant packet to increase the pressure and/or temperature within the second plurality of tubes 160 of the dual inflation assembly 104, 604.

Sensor 130 may allow the processor to provide the command which will result in the activation of subsequent reactant packets in the plurality of reactant packets 210 (e.g., secondary stage reactant packets after first stage of reactant packets) at an optimal time depending on the conditions inside and outside of the second plurality of tubes 160 of the dual inflation assembly 104, 604. For example, if the surrounding environment is very hot, (e.g., greater than 100° F. (38° C.)) the pressure and/or temperature generated by or resulting from the plurality of reactant packets 210 as a first stage of reactant packets may be much greater than in a cold environment. Therefore, parameter measurements from sensor 130 may allow delay by the processor in activating subsequent reactant packets in a warmer environment, or faster activation of subsequent reactant packets in a colder environment. In various embodiments, the processor may receive the parameter measurement, and in response, may prevent subsequent reactant packets, such as an adjacent reactant packet, from activating. Preventing subsequent reactant packets from reacting may occur because processor has determined, based on parameter measurements from sensor 130, that adequate pressure and/or temperature has been reached in or around the second plurality of tubes 160 of the dual inflation assembly 104, 604. Preventing subsequent reactant packets from reacting may also occur because processor has determined that the second plurality of tubes 160 of the dual inflation assembly 104, 604 is sufficiently inflated to serve as railings of a flotation device for a life raft configuration, based on a parameter measurement comprising position information of the dual inflation assembly 104, 604.

In various embodiments, sensor 130 may allow the processor to activate auxiliary reactant packets if needed to increase pressure (e.g., in a cold environment in which one or more stages of reactant packets may not produce enough gas to reach a pressure threshold, or fully inflate the second plurality of tubes 160 of dual inflation assembly 104, 604). Activation of auxiliary reactant packets may take place at any stage of reactant packets. For example, the processor may command trigger system 92 to apply current to reactant packet 110, wherein an adjacent reactant packet in the plurality of reactant packets 210 is an auxiliary reactant packet that is not activated simultaneously with reactant packet 110. In response, reactant packet 110 may create enough gas to reach the necessary parameter (e.g., pressure) threshold, and therefore processor may not activate, or prevent activation of, an auxiliary reactant packet. In various embodiments, reactant packet 110 may not create enough gas to reach the necessary parameter (e.g., pressure) threshold, so in response, the processor may command trigger system 92 to apply current the adjacent reactant packet in the plurality of reactant packets 210 via cable assembly 98 to provide additional gas to reach the pressure threshold. This process may be continued until the second plurality of tubes 160 are inflated to a pressure threshold. Overall, reactant packets in evacuation system 100 may be activated in any suitable order and/or at any suitable time as determined by the processor.

In various embodiments, evacuation system 100 may comprise a timer (or sensor 130 may comprise a timer), allowing stages of reactant packets in the second plurality of tubes 160 of the dual inflation assembly 104, 604 to be activated in time intervals. Therefore, the processor may detect the lapse of a delay duration (step 810) after reaction of the first reactant packet. In response, the processor may command that additional reactant packets (e.g., adjacent reactant packets) be activated. Again, the reactant packets comprised in the second plurality of tubes 160 of the dual inflation assembly 104 may be activated in any suitable order. The delay duration may be a predetermined time period to provide time spacing between activation of the reactant packets and/or reactant packet stages in the second plurality of tubes 160 of the dual inflation assembly 104, 604. In various embodiments, evacuation system 100 may have a timer and a sensor 130, such that there are set time intervals between the activation of reactant packet stages. Under normal (i.e., temperate) conditions in the surrounding environment, i.e., conditions which will not cause a decrease or increase in pressure from the gas generated by the reactant packets causing the need for an altered timing of reactant packet activation, reactant packets may be activated as dictated by the time intervals. However, if the surrounding conditions cause an increase or decrease in gas pressure generated by the reactant packets (as discussed herein) from the gas pressure generated in normal or temperate conditions, sensor 130 may detect such a pressure difference, and the processor may alter the timing of the reactant packet activation to account the pressure difference.

As discussed herein, the first reactant packet may be a first stage reactant packet, such as reactant packet 110. Therefore, in order to fully inflate the second plurality of tubes 160, additional reactant packets may need to be activated to produce gas (e.g., an adjacent reactant packet in the second plurality of tubes 160). Accordingly, the processor may command activation of the adjacent reactant packet (step 812) after commanding activation of the first reactant packet. The gas generated by the activation of the first and/or second reactant packet and the reaction of the chemically reactive material therein may inflate the second plurality of tubes (step 814), resulting in a raft configuration to be used as a flotation device.

Evacuation system 100 has the benefit of providing gas from the reactant packets directly into the second plurality of tubes 160 of dual inflation assembly 104, 604, thus minimizing the size of the pressure cylinder to inflate the first plurality of tubes for a slide configure. The reactant packets being disposed in the second plurality of tubes may also allow only the first plurality of tubes to be inflated when a raft configuration is not necessary (e.g., after a ground landing).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A dual inflation assembly, comprising:
   a first plurality of tubes in fluid communication with each other, the first plurality of tubes configured to inflate from a first deflated state to a first inflated state and form a slide configuration of an evacuation system of an aircraft; and
   a second plurality of tubes coupled to the first plurality of tubes, the second plurality of tubes in fluid communication with each other, the second plurality of tubes configured to be in a second deflated state in the slide configuration, wherein:
      the second plurality of tubes are configured to inflate and form a raft configuration including a support structure comprising the first plurality of tubes and a railing structure comprising the second plurality of tubes, and
      the second plurality of tubes are fluidly isolated from the first plurality of tubes.

2. The dual inflation assembly of claim 1, further comprising a triggering system configured to convert the dual inflation assembly from the slide configuration to the raft configuration.

3. The dual inflation assembly of claim 1, further comprising a reactant packet disposed within the second plurality of tubes, the reactant packet including a chemically reactive material configured to react to produce a gas and inflate the second plurality of tubes.

4. The dual inflation assembly of claim 3, further comprising an aspirator coupled to the first plurality of tubes.

5. The dual inflation assembly of claim 3, further comprising an ignitor coupled to the reactant packet, the ignitor configured to activate the reactant packet and inflate the second plurality of tubes to form a raft configuration.

6. The dual inflation assembly of claim 3, further comprising a bag disposed in the second plurality of tubes, wherein the reactant packet is disposed within the bag.

7. The dual inflation assembly of claim 3, further comprising a plurality of reactant packets that includes the reactant packet.

8. An aircraft including an evacuation system, the evacuation system comprising:
   a first plurality of tubes;
   an aspirator coupled to the first plurality of tubes, the aspirator in fluid communication with a pressure cylinder and configured to inflate the first plurality of tubes from a first deflated state to a first inflated state upon deployment of the evacuation system into a slide configuration;
   a second plurality of tubes coupled to the first plurality of tubes;
   a reactant packet disposed within the second plurality of tubes, the reactant packet including a chemically reactive material configured to react to produce a gas and inflate the second plurality of tubes from a second deflated state to a second inflated state; and
   a sliding surface disposed between the first plurality of tubes and the second plurality of tubes,
   wherein the second plurality of tubes are fluidly isolated from the first plurality of tubes and comprise a railing.

9. The evacuation system of claim 8, further comprising a sliding surface disposed between the first plurality of tubes and the second plurality of tubes.

10. The evacuation system of claim 8, wherein the second plurality of tubes are in the second deflated state when the evacuation system is in the slide configuration.

11. The evacuation system of claim 8, further comprising a plurality of reactant packets including the reactant packet.

12. The evacuation system of claim 8, further comprising a bag disposed within the second plurality of tubes, wherein the reactant packet is disposed within the bag.

13. The evacuation system of claim 8, further comprising an ignitor coupled to the reactant packet, the ignitor configured to activate the reactant packet upon detachment of the evacuation system from the aircraft.

14. The evacuation system of claim 8, further comprising a trigger system and a cable assembly, wherein the cable assembly is coupled to the trigger system and the reactant packet.

15. The evacuation system of claim 14, wherein the trigger system is coupled to the second plurality of tubes.

16. A method of converting a dual inflation assembly of an evacuation system from a slide configuration to a raft configuration, comprising:
   receiving, by a processor, a parameter measurement from a sensor;
   detecting, by the processor, that a first plurality of tubes of the dual inflation assembly is acting as a flotation device in response to receiving the parameter measurement;

commanding, by the processor, a trigger system to apply a current to a reactant packet disposed in a second plurality of tubes of the dual inflation assembly, the second plurality of tubes coupled to the first plurality of tubes in a first inflated state, wherein the second plurality of tubes inflate from a second deflated state to a second inflated state in response to the current igniting an electrical ignitor of the reactant packet and activating the reactant packet to produce a gas, wherein:

the second inflated state of the second plurality of tubes forms the raft configuration including a support structure comprising the first plurality of tubes and a railing structure comprising the second plurality of tubes, and the second plurality of tubes are fluidly isolated from the first plurality of tubes.

17. The method of claim 16, wherein the reactant packet is disposed within a bag, the bag configured to contain a reacting of a chemically reactive material from the reactant packet.

18. The method of claim 16, wherein the first plurality of tubes is in the first inflated state prior to activating the reactant packet.

\* \* \* \* \*